(12) United States Patent
Suzuki et al.

(10) Patent No.: US 8,310,579 B2
(45) Date of Patent: Nov. 13, 2012

(54) SOLID-STATE IMAGING APPARATUS WITH PLURAL RESET UNITS EACH RESETTING A CORRESPONDING ONE OF PLURAL BLOCK WIRINGS

(75) Inventors: Satoshi Suzuki, Hiratsuka (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/553,675

(22) Filed: Sep. 3, 2009

(65) Prior Publication Data
US 2010/0060759 A1    Mar. 11, 2010

(30) Foreign Application Priority Data
Sep. 10, 2008 (JP) .................................. 2008-232317

(51) Int. Cl.
*H04N 3/14* (2006.01)
(52) U.S. Cl. ....................................................... 348/308
(58) Field of Classification Search .................. 348/294, 348/296, 302, 308
See application file for complete search history.

(56) References Cited

U.S. PATENT DOCUMENTS

| | | | | |
|---|---|---|---|---|
| 5,998,779 A | 12/1999 | Kozuka | ........................ | 250/208.1 |
| 6,377,304 B1 * | 4/2002 | Saitoh | ............................ | 348/308 |
| 6,952,228 B2 * | 10/2005 | Yoneda et al. | ................. | 348/308 |
| 7,298,405 B2 | 11/2007 | Inui et al. | ........................ | 348/304 |
| 7,554,591 B2 | 6/2009 | Kikuchi et al. | ................ | 348/308 |
| 7,629,568 B2 * | 12/2009 | Koizumi et al. | ........... | 250/214 R |
| 7,636,108 B2 | 12/2009 | Suzuki et al. | | |
| 2004/0080647 A1 | 4/2004 | Inui et al. | ........................ | 348/304 |
| 2008/0211948 A1 | 9/2008 | Kikuchi et al. | ................ | 348/302 |
| 2008/0218627 A1 | 9/2008 | Suzuki et al. | | |

FOREIGN PATENT DOCUMENTS

| | | |
|---|---|---|
| EP | 0 851 673 | 7/1998 |
| JP | 10-191173 | 7/1998 |
| JP | 2003-234963 | 8/2003 |
| JP | 4054839 | 12/2007 |

* cited by examiner

*Primary Examiner* — Timothy J Henn
(74) *Attorney, Agent, or Firm* — Fitzpatrick, Cella, Harper & Scinto (57) ABSTRACT

The present invention is a solid-state imaging apparatus having a plurality of signal accumulating units for accumulating signals from a plurality of pixels each including a photoelectric conversion element, a common signal transferring unit for transferring a signal outputted from the signal accumulating unit, a plurality of reset units for resetting a potential of a signal path of the common signal transferring unit, a horizontal scanning unit for outputting, to the common signal transferring unit, the signal accumulated in the plurality of signal accumulating units, and a plurality of reset controlling units for controlling the reset units, wherein the horizontal scanning unit includes a plurality of horizontal scanning blocks, an operation of the horizontal scanning unit is controlled by a reference pulse supplied to the horizontal scanning block, and the reset controlling unit is arranged in the horizontal scanning block.

8 Claims, 13 Drawing Sheets

SOLID-STATE IMAGING APPARATUS WITH PLURAL RESET UNITS EACH RESETTING A CORRESPONDING ONE OF PLURAL BLOCK WIRINGS

BACKGROUND OF THE INVENTION

1. Field of the Invention

The present invention relates to a solid-state imaging apparatus, and more particularly to a read circuit in the solid-state imaging apparatus.

2. Description of the Related Art

Solid-state imaging apparatuses have been used in digital cameras in recent years. As typical solid-state imaging apparatuses, a CCD type and an MOS type solid-state imaging apparatuses are cited. An MOS type solid-state imaging apparatus has a pixel unit in which photoelectric conversion elements such as a photodiode are two-dimensionally arranged, a signal accumulating unit which accumulates signals from the pixel unit, and a common signal line (horizontal signal line) for outputting signals of the signal accumulating unit to an outside.

In recent years, in response to increase in the number of pixels of solid-state imaging apparatus, enhancement in speed of signal reading has been demanded. A horizontal scanning unit especially needs to select a number of signals and read the signals as compared with a vertical scanning circuit, and therefore, is required to enhance the speed.

Japanese Patent Application Laid-Open No. 2003-234963 describes a noise reduction technique when signal reading speed in the horizontal scanning unit is enhanced. More specifically, a shift register which configures the horizontal scanning unit is divided into a plurality of partial shift registers. Japanese Patent Application Laid-Open No. 2003-234963 describes the construction in which a shift clock control circuit individually controls supply of the shift clock to a partial shift register for each partial shift register.

Further, the signal reading speed is influenced by the capacity of a common signal line and the reset speed of the common signal line. Reset of the common signal line means setting the potential of the common signal line to a predetermined potential before reading a signal or after reading the signal.

Japanese Patent Application Laid-Open No. H10-191173 describes the construction having a unit for setting the potential of the common output lines to a predetermined potential (first reset unit), and a unit for electrically connecting the common output lines and setting the common output lines at the same potential (second reset unit), in the construction having two-system common output lines.

In Japanese Patent No. 4,054,839, in order to reduce the capacity of the common signal line, a plurality of divided block wirings are included between the signal read circuit and the common signal line. Reset units for resetting the potentials of the block wirings are provided at a plurality of block wirings.

When a plurality of reset units are provided for a common signal transferring unit including a common output line as Japanese Patent Application Laid-Open No. H10-191173 and Japanese Patent No. 4,054,839 in the construction using a block horizontal scanning unit as Japanese Patent Application Laid-Open No. 2003-234963, the image quality may degrade depending on the method of reset operation. The construction having a reset unit for each block wiring, for example, will be described.

When the control pulse supply wiring for controlling the reset unit provided at the block wiring is led from the end of the horizontal scanning unit, the block wiring closer to the end is reset earlier. This is because the time constant of the path to which the control pulse is supplied differs depending on the arrangement of the reset unit. Meanwhile, a switch group for reading a signal from a signal accumulating unit group corresponding to each block wiring receives the pulse from the corresponding block horizontal scanning unit, and reads the signal to the block wiring. The control line which controls each block of the horizontal scanning unit is often arranged to propagate to the left and right from the block horizontal scanning circuit located in the center among the block horizontal scanning units, in order to minimize the delay due to the time constant of the pulse supply path. Accordingly, in the respective block horizontal scanning unit, the one in the center operates the earliest, and the delay amount increases toward those at both ends, so that the time of signal reading differs in each block.

When the signal reading speed is enhanced, the temporal margin of the timing of reading a signal from the signal accumulating unit through a switch and the timing at which the common signal line or the block wiring is reset needs to be decreased. Here, the reason why the margin is required is that if the period in which the signal is read to the block wiring, and the period in which the reset operation of the block wiring is performed overlap each other, the signal to be read which is present in the block wiring is reset. If the coinciding amount differs at each block wiring, the signal read amount differs at each block wiring even when the signal of the same magnitude is read, and thereby, shading occurs to influence the image quality.

In the above described construction, timings of read and reset may differ significantly in the block scanning circuit unit in the center into which a pulse to the switch that reads the signal from the signal accumulating unit is input the earliest, and in the block scanning circuit units at both ends into which the pulses are input the latest. As a result, in order to secure a sufficient temporal margin, extra waiting time is required, and a desired operation speed is not obtained. Alternatively, if the timings are closely set unreasonably, a problem in image quality such as shading may occur.

As an example of providing a plurality of reset units, the example of providing the reset units at a plurality of block wirings is described, but the example is not limited to this, and a similar problem also occurs to the case where a plurality of reset units are provided for the common signal line.

In view of such a problem, the present invention has an object to provide a solid-state imaging apparatus capable of performing a reset operation at a high speed while suppressing image quality degrading by shading.

SUMMARY OF THE INVENTION

In view of the above described problem, the present invention provides a solid-state imaging apparatus comprising: a plurality of signal accumulating units for accumulating signals from a plurality of pixels each including a photoelectric conversion element; a common signal transferring unit for transferring each signals outputted from each of the signal accumulating units; a plurality of reset units for resetting a potential of a signal path of the common signal transferring unit; a horizontal scanning unit for outputting, to the common signal transferring unit, the signal accumulated in the plurality of signal accumulating units; and a plurality of reset controlling units for controlling each of the plurality of reset units, wherein the horizontal scanning unit comprises a plurality of horizontal scanning blocks, an operation of the horizontal scanning unit is controlled by a reference pulse supplied to the horizontal scanning blocks, and the reset controlling unit is arranged in the horizontal scanning block.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, a construction of the present invention will be described by citing embodiments. First, a general construction of the solid-state imaging apparatus applicable to all the embodiments of the present invention will be described first.

Figure 1:
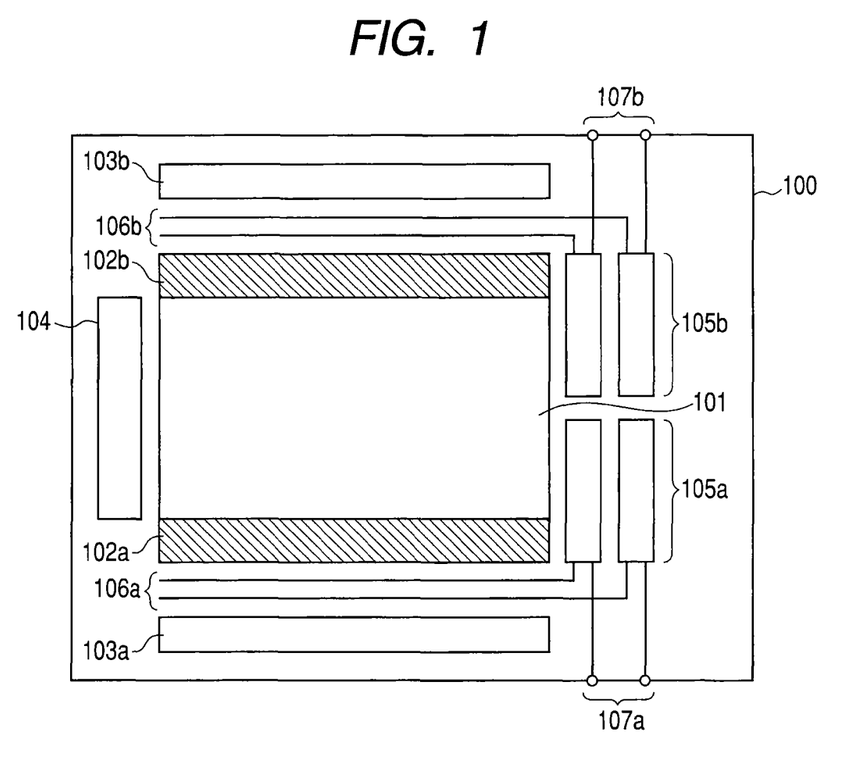
FIG. 1 is a block diagram of a solid-state imaging apparatus applicable to the present invention.

FIG. 1 is a general configuration diagram of a solid-state imaging apparatus 100.

A pixel unit 101 is included. In the pixel unit 101, a plurality of photoelectric conversion elements that generate signals by incident light such as photodiodes are arranged. Column circuit units 102a and 102b include signal accumulating units. The column circuit units 102a and 102b may have signal amplifying units and A/D converters. The signals from the pixel unit 101 can be read by being optionally distributed to the column circuit units 102a and 102b.

Horizontal scanning units 103a and 103b sequentially output the signals, which are read to the column circuit unit 102 from the pixel unit 101, to common signal transferring units 106a and 106b.

A vertical scanning unit 104 sequentially scans pixels so that the signals of the pixel unit 101 are output in parallel to the column circuit unit 102. Output amplifying circuits 105a and 105b sequentially amplify the signals output to the common signal transferring unit 106. Output terminals 107a and 107b are included.

The present invention has a characteristic in a control circuit of a reset unit that performs reset of the horizontal scanning unit and the common signal transferring unit in such a solid-state imaging apparatus. In the following embodiments, the characteristic part of the present invention will be described in detail.

Embodiment 1

Figure 2:
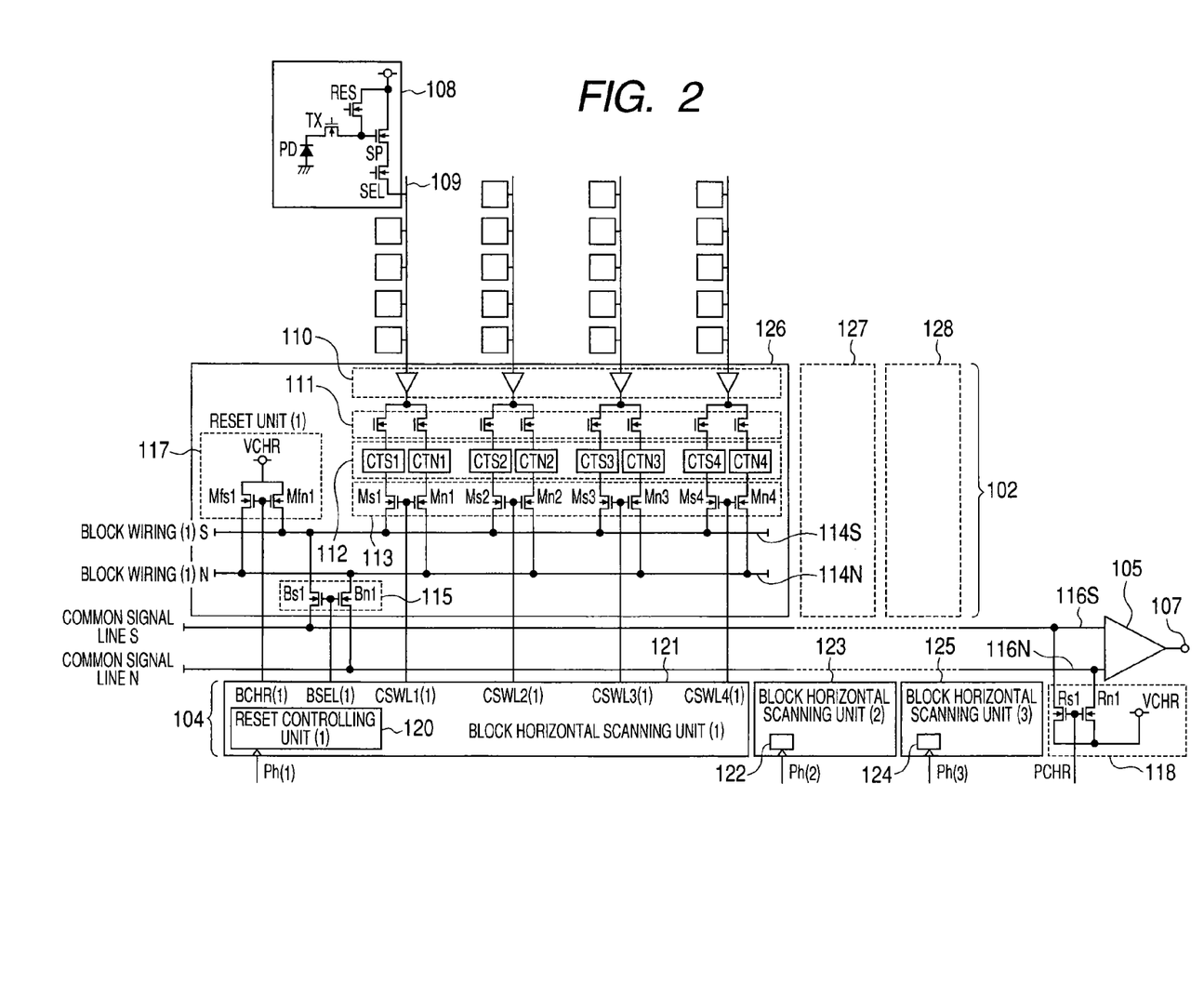
FIG. 2 is a block diagram for describing a signal path of the solid-state imaging apparatus according to embodiment 1.

FIG. 2 illustrates a signal path to the output terminal 107 from the pixel unit 101 of FIG. 1 through the column circuit unit 102.

In the pixel unit 101, pixels 108 are two-dimensionally arranged. As a photoelectric conversion element PD, for example, a photodiode can be used. As a pixel amplifying potion SF, for example, a source follower circuit can be used. A transferring portion TX transfers an electric charge of the photoelectric conversion element PD to an input portion of the pixel amplifying portion. A pixel reset portion RES resets the input portion of the pixel amplifying portion. A pixel selecting portion SEL is provided according to necessity and selects a pixel. Here, the construction having each element in each pixel is shown, but a construction may be adopted, in which a plurality of photoelectric conversion elements share the pixel amplifying portion, the pixel reset portion and the like. Further, a construction may be adopted, in which a pixel is selected according to the potential of the input portion of the amplifying portion without providing the pixel selecting portion. Furthermore, a construction may be adopted, in which the signal generated in the photoelectric conversion element is output to a vertical signal line which will be described later through the transfer portion without providing the pixel amplifying portion and the like in the pixel. Any construction may be adopted as long as it generates a signal corresponding to incident light by a photoelectric conversion element and can output the signal. A vertical signal line 109 outputs signals from the pixels.

A column circuit unit 102 is configured by arranging a plurality of column circuits provided at each pixel column or a plurality of pixel columns. Further, column circuit blocks 126 to 128 are configured by a plurality of column circuits, and the column circuit unit 102 is configured by a plurality of column circuit blocks.

The column circuit block 126 has an amplifying unit 110 that amplifies signals output in parallel from the pixel unit through the vertical signal line, and a switch 111 that transfers the signals after being amplified in the amplifying unit 110 to a signal accumulating unit at a post stage. Further, the column circuit block 126 has a signal accumulating unit 112 which accumulates the signals after being amplified in the amplifying unit 110. The signal accumulating unit has at least two accumulating capacitors (CTS, CTN) for each column circuit in order to accumulate both an optical signal and a signal with a noise signal superimposed on the optical signal, in each column circuit. As the noise signals, those generated in the pixels or those generated in the amplifying unit 110 are conceivable. Numerical characters correspond to the respective pixel columns.

A switch 113 is for outputting the signals accumulated in the signal accumulating unit 112 to block wirings 114S and 114N which will be described later.

A block wiring 114 includes a plurality of blocks each including a plurality of signal accumulating units, and the signals from the signal accumulating units included in the same block are read respectively.

By providing the block wiring, the number of switches directly connected to a common signal line 116 can be decreased, and the parasitic capacitance of the common signal transferring unit can be reduced. Here, a block wiring 114S is a wiring for outputting optical signals, and a block wiring 114N is a wiring for outputting noise signals. In this case, the construction having only a pair of block wirings is shown, but a plurality of pairs may be further included.

A switch 115 is for outputting the signals of the block wirings 114S and 114N to common signal lines 116S and 116N which will be described later.

The signals accumulated in the signal accumulating unit 112 are output to the common signal line 116 through the switch 113, the block wiring 114 and the switch 115. A wiring 116S is for outputting optical signals, and A wiring 116N is for outputting noise signals. A plurality of pairs may be further included as the block wirings.

The common signal transferring unit is configured by the block wiring 114, the switch 115 and the common output line 116. The signals are read to the output amplifying unit 105 by a capacitance division method in which the gain is determined by the ratio of the capacitance value of the signal accumulating unit and the capacitance value of the common signal transferring unit, and thereafter, are read to an outside.

Each of the block wirings 114 and each of the common signal lines 116 are each made of a pair of lines, and signals accumulated in the signal accumulating portions CTS and CTN are output to the wirings. Noise components are configured to be suppressible in the differential circuit at the post-stage by using these signals.

The block wiring 114 is provided with a reset unit 117, and the common signal line 116 is provided with a reset unit 118. The reset unit supplies a desired voltage (reset voltage) VCHR to the block wiring or the common signal line to reset the potential of the signal path of the common signal transferring unit. By including the reset unit 117 in each of the plurality of block wirings, the reset operation of the block wirings 114S and 114N can be performed at a high speed.

The horizontal scanning unit 104 has a plurality of block horizontal scanning units 121, 123 and 125. The operation of the horizontal scanning unit is controlled by the reference pulse supplied to the block horizontal scanning units. Controlling units 120, 122 and 124 for the reset units are included in the block horizontal scanning unit. One reset controlling unit may be provided at each of all the block horizontal scanning units, or may be provided at each of a plurality of block horizontal scanning units instead of each of all the block horizontal scanning units.

Figure 3:
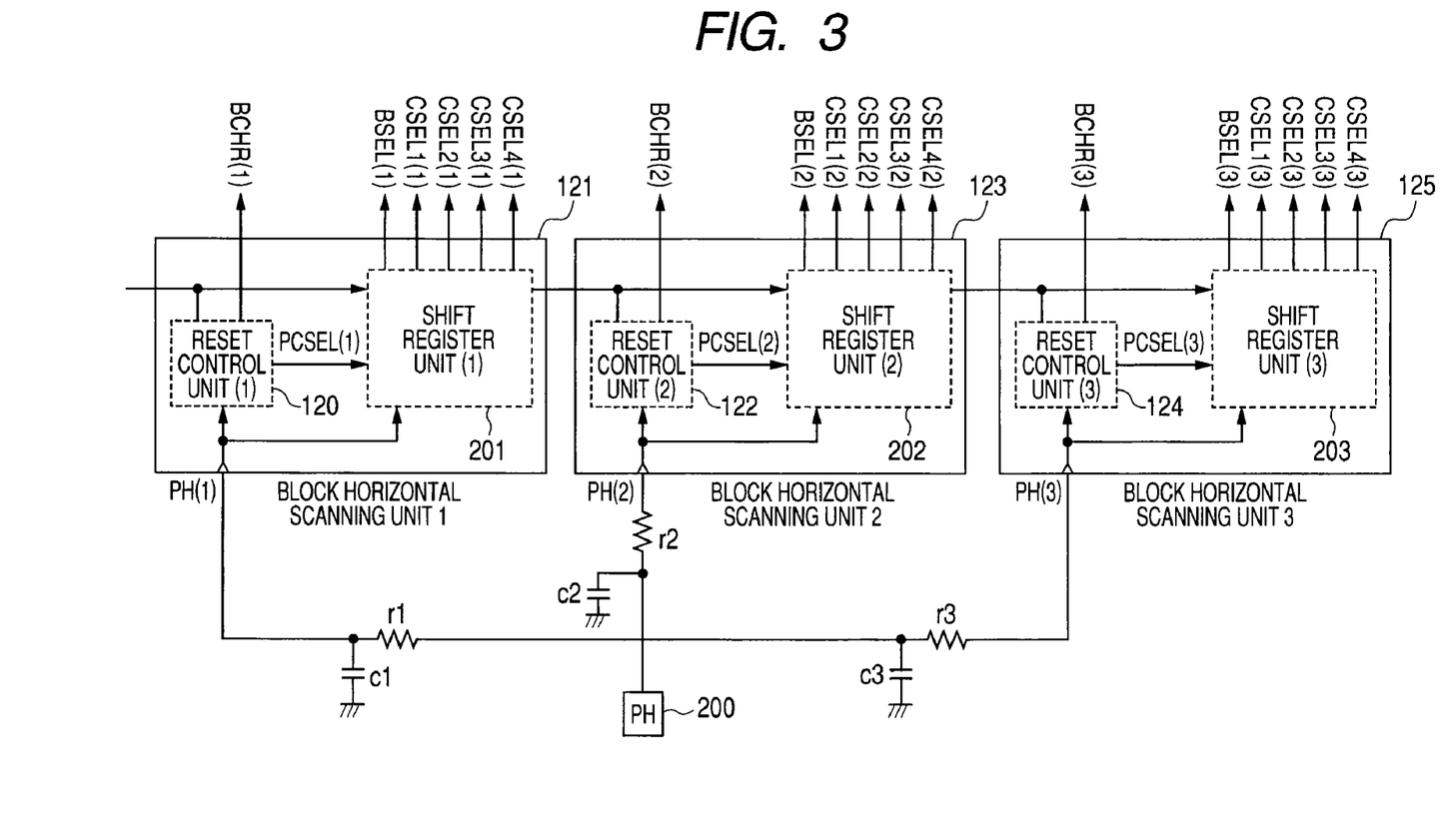
FIG. 3 is a configuration diagram of a horizontal scanning unit according to embodiment 1.

FIG. 3 illustrates a circuit configuration of the horizontal scanning unit 104 of FIG. 2 in detail. Wiring resistors r1 to r3 which are formed by leading wirings are illustrated in FIG. 3, and parasitic capacitors c1 to c3 are also illustrated. A reference pulse PH200 that is input from the outside of the solid-state imaging apparatus 100 is led by wirings and input into each of the block horizontal scanning units. Therefore, the reference pulses PH(1), PH(2) and PH(3) that actually drive the respective block horizontal scanning units differ in signal reaching time in accordance with the wiring distances to the respective block horizontal scanning units. Since the circuit configurations in the respective block horizontal scanning units and the operation timings are all the same, only the first block horizontal scanning unit 121 will be described in detail.

The first block horizontal scanning unit 121 opens and closes switches in a read switch group 113 in sequence to read the signals accumulated in the signal accumulating unit 112 in synchronism with the reference pulse PH(1). More specifically, the first block horizontal scanning unit 121 generates read pulses CSEL1(1) to CSEL4(1) by using a shift register 201. A concrete block configuration in the shift register 201 will be described later.

Further, the first block horizontal scanning unit 121 includes a first reset control unit 120, and generates a reset pulse BCHR(1) which controls the reset unit 117.

Figure 4:
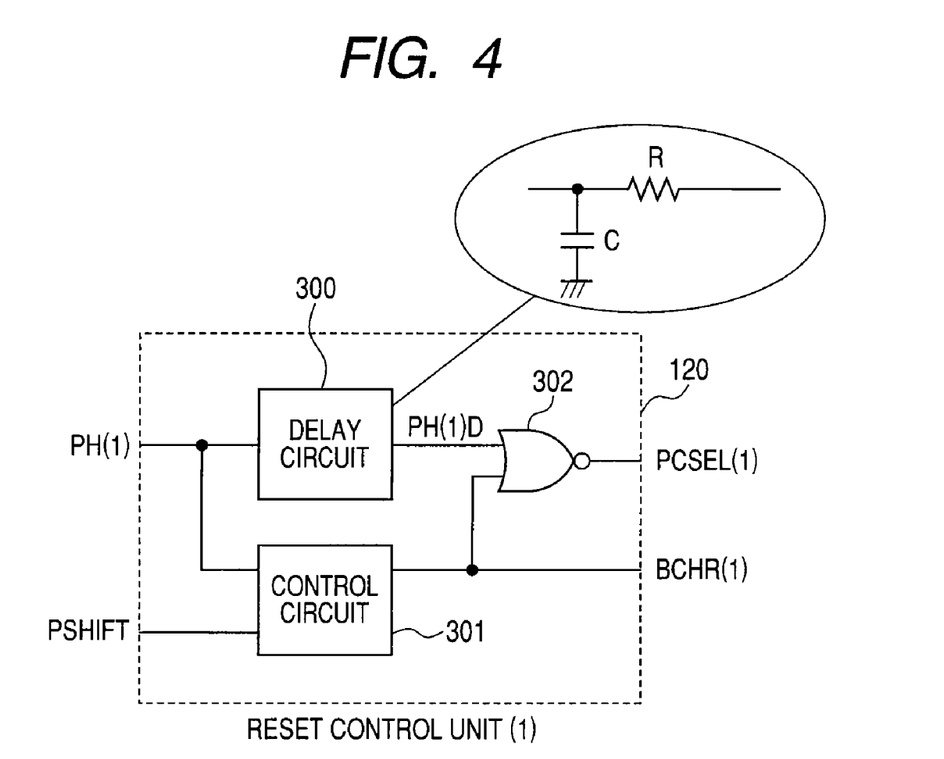
FIG. 4 is a configuration diagram of a reset control unit according to embodiment 1.

FIG. 4 illustrates a circuit configuration of the reset control unit 120. The first reset control unit 120 includes a delay circuit 300, a control circuit 301 and a logic circuit 302. The delay circuit 300 is configured by, for example, a resistor and a capacitor element, and generates a delay pulse PH(1)D which is the reference pulse PH(1) delayed by a predetermined time. The control circuit 301 generates the reset pulse BCHR by the reference pulse PH(1) and a shift pulse PSHIFT. The logic circuit 302 is configured by, for example, an NOR circuit, generates a read reference pulse PCSEL(1) by the reset pulse BCHR(1) and the delay pulse PH(1)D and supplies the read reference pulse PCSEL(1) to the shift register 201.

Figure 5:
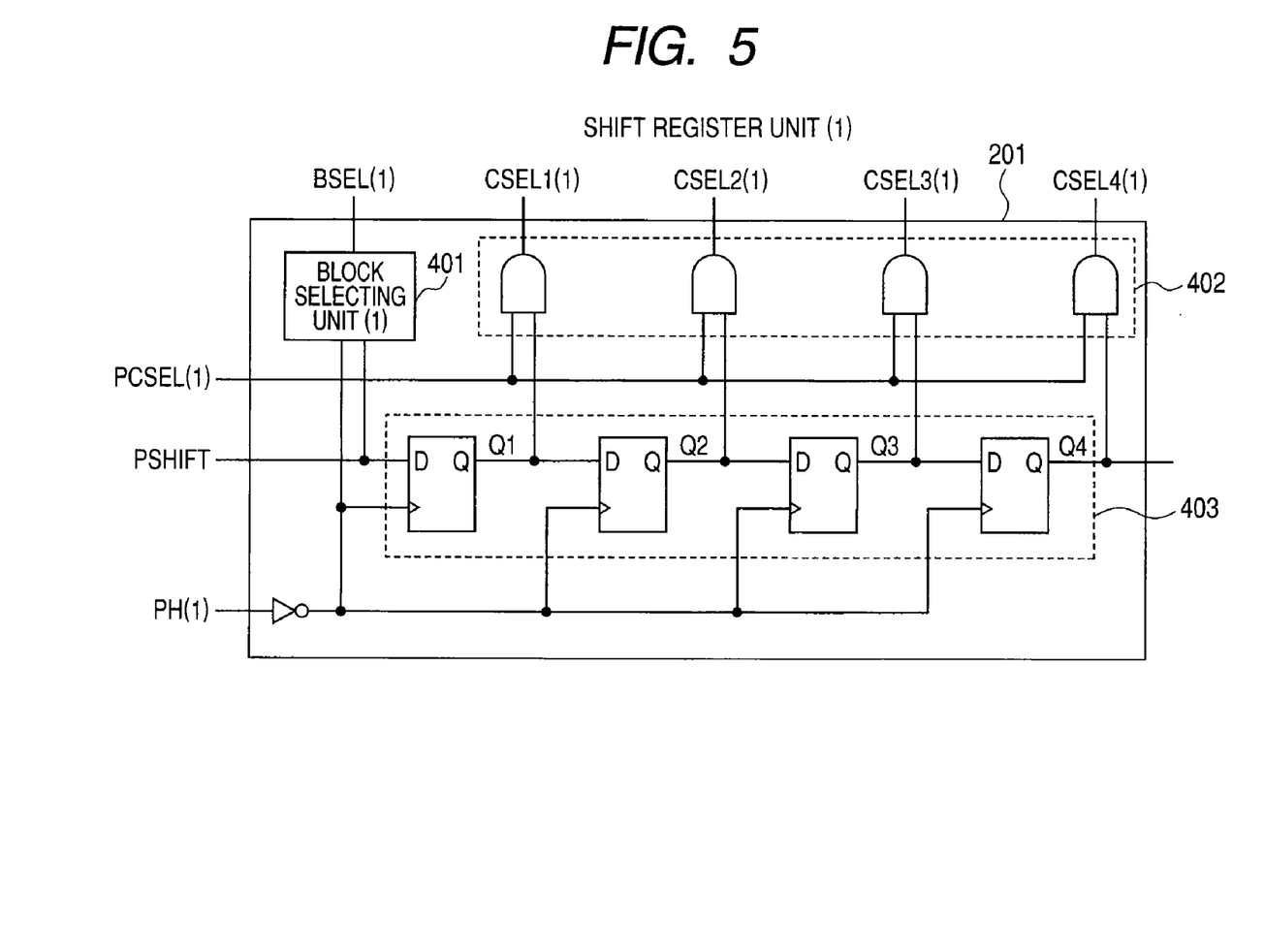
FIG. 5 is a configuration diagram of a shift register unit according to embodiment 1.

FIG. 5 illustrates a construction of the shift register 201 included in the block horizontal scanning unit 121. The shift register 201 is configured by a flip flop 403, and sequentially transfers a shift pulse PSHIFT in synchronism with the reference pulse PH(1). The shift register 201 generates the read pulses CSEL1(1) to CSEL4(1) by the logical product of the shift pulse PSHIFT and the read reference pulse PCSEL(1). An AND circuit 402 generates a logical product signal of each of shift clocks Q1 to Q4 and the PCSEL(1). A block selecting unit 401 generates a control signal of the read switch 115. Here, the block selected by the block selecting unit refers to a column circuit block.

The block selecting unit 401 generates a block selecting signal BSEL(1) for controlling continuity and non-continuity of the block wiring and the common signal line. Thereby, the signal from the signal accumulating unit included in a specific column circuit block is output to the common signal line through the block wiring.

Figure 6:
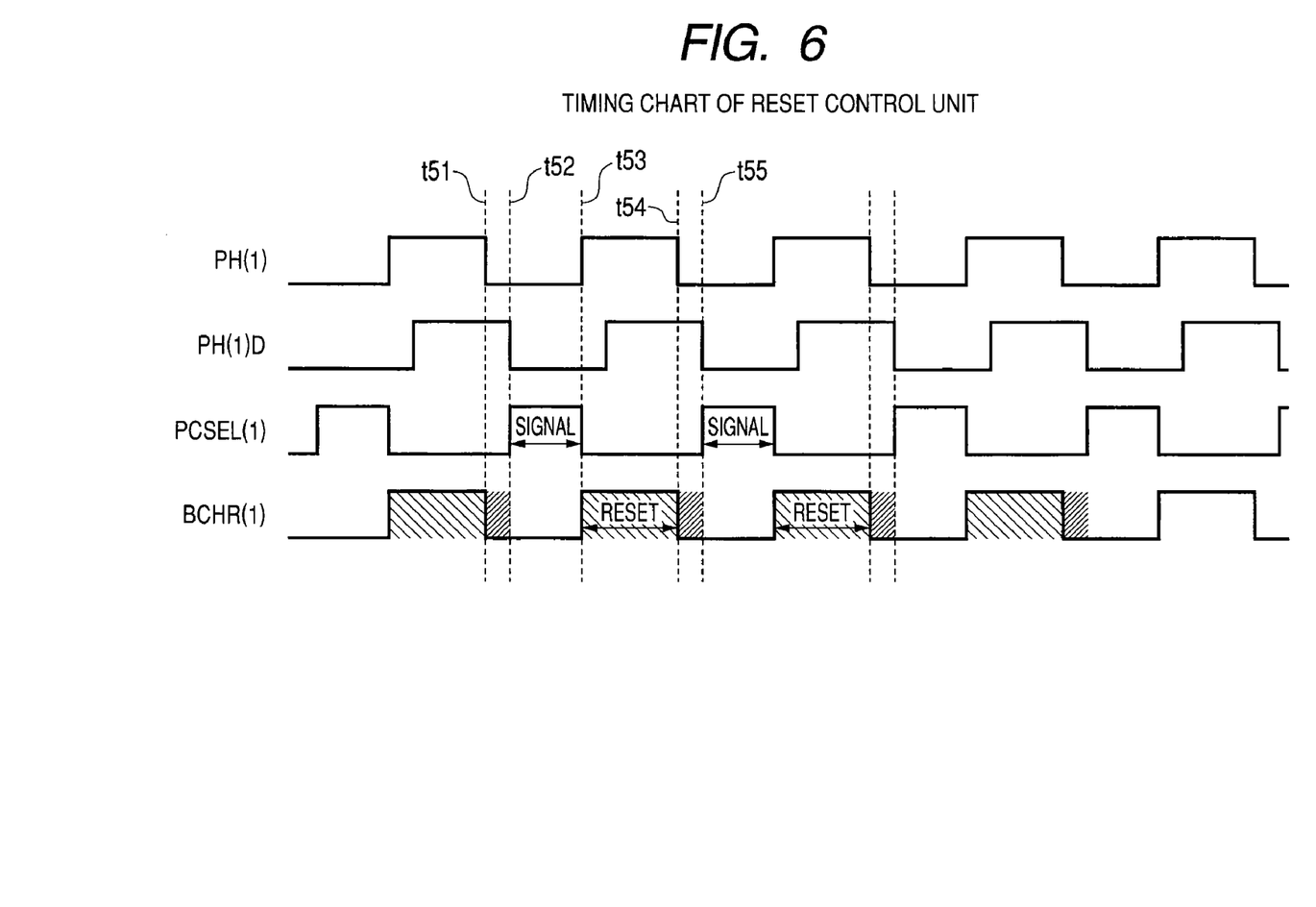
FIG. 6 is a timing chart of the reset control unit according to embodiment 1.

FIG. 6 is an operation timing chart of the reset control unit (1)120.

When the reference pulse PH(1) is input into the block horizontal scanning unit 121, the delay circuit 300 generates a signal that is a delay signal PH(1)D delayed by the time from time t51 to time t52. The delay circuit 300 generates the read reference pulse PCSEL(1) by the logical product of the reference pulse PH(1) and the delay signal PH(1)D (time t52 to t53). Meanwhile, the reset signal BCHR(1) is generated in the same timing as the reference pulse PH(1). Specifically, the phase relation of the read reference pulse PCSEL(1) and the reset signal BCHR(1) is determined by the delay circuit 300 of the reset control unit (1). Therefore, the phase relation of the read reference pulse PCSEL(1) and the reset signal BCHR (1) can be made the same in the other block horizontal scanning unit, and the reset period can be made constant among the respective block horizontal scanning units.

Figure 7:
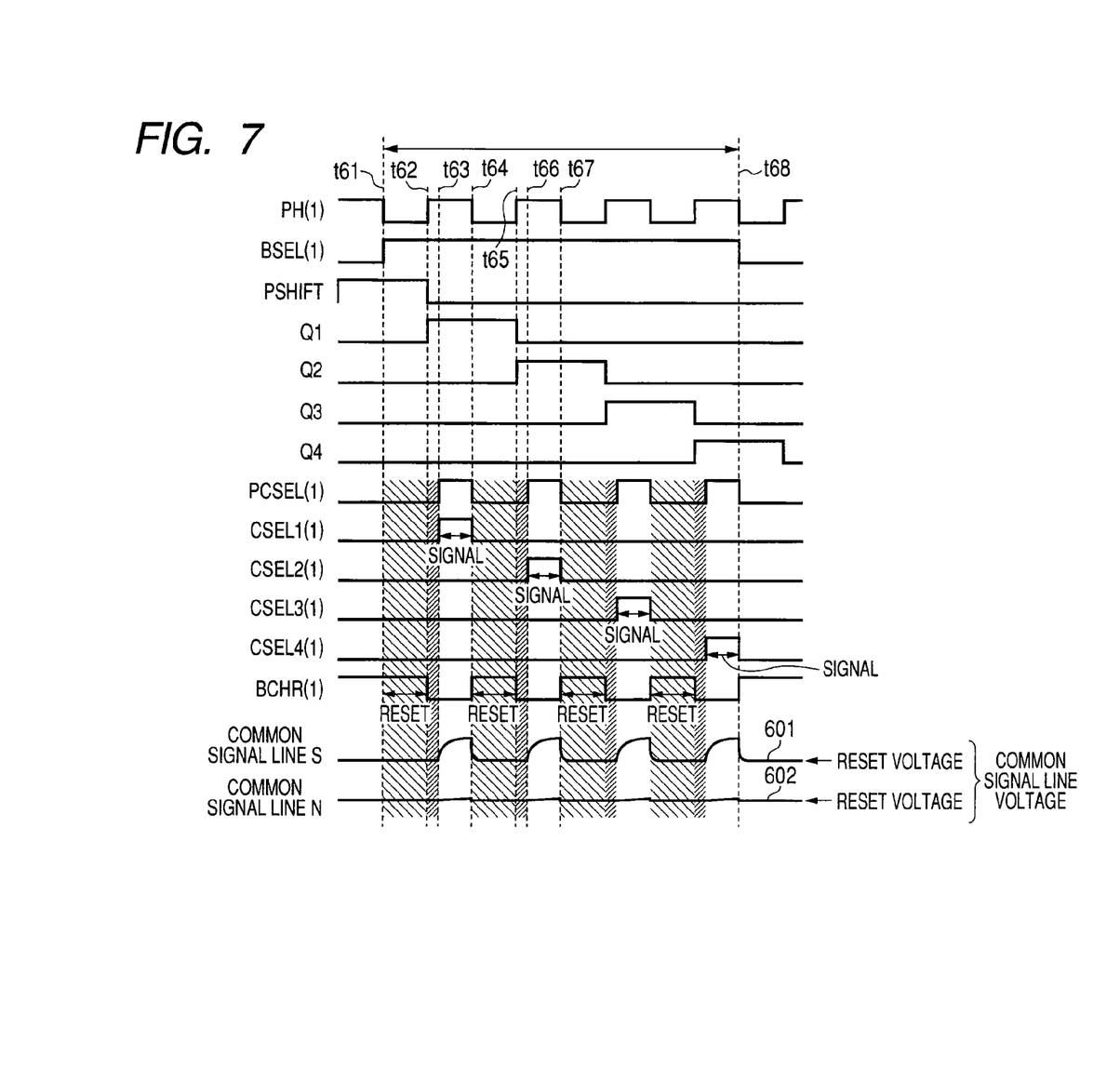
FIG. 7 is a timing chart of a block horizontal scanning unit according to embodiment 1.

FIG. 7 is a whole operation timing chart of the block horizontal scanning unit 121.

First, the shift pulse PSHIFT is input into the shift register unit 201. Thereafter, the block selecting signal BSEL(1) is set at a high level by the block selecting unit 401 (time t61), and the block wiring (1)114S and the common signal line (1)116S are brought into an electrical continuity state. At the same time, the block wiring (1)114N and the common signal line (1)116N are also brought into an electrical continuity state. More specifically, a signal from the column circuit block 126 corresponding to the block horizontal scanning unit 121 is in a readable state.

The reset signal BCHR(1) at this time is kept at a high level until t62. The time from t61 to t68 is the selecting period of the first column circuit block 126, and the reset signal BCHR(1) keeps a high level to t62, which is a part of the selecting period, from the non-selecting period of the first column circuit block 126. The reset signal BCHR keeps a high level in a non-selecting period of each block not only in the first column circuit block but also in all the column circuit blocks. Specifically, the reset control unit performs control so that the reset unit provided at the block wiring corresponding to the block to which the selecting signal is not supplied is brought into a reset state. By such an operation, the reset operation directly after the column circuit block is selected (t61 to t62 in this case) can be performed at a high speed.

At the timing t62 of rise of an inversion signal of the reference pulse PH(1), an output Q1 of the flip flop changes to a high level. Thereafter, the shift pulses Q2 to Q4 are sequentially transferred by the flip flop 403 in synchronism with the inversion signal of the reference pulse PH(1).

Further, at t62, the reset signal BCHR(1) is set at a low level.

Next, at t63, the read signal CSEL(1) is generated by the logical product of the read reference pulse PCSEL(1) and the shift pulse Q1. The period from the time t62 to the time t63 corresponds to a delay time of the delay circuit 300 in the reset control unit (1). At the timing of the time t63, the read signal CSEL(1) is set at a high level. Thereby, a signal is read to the block wiring and the common signal line 106 from the signal accumulating unit 112 of the first column circuit block. A voltage 601 of the common signal line S and a voltage 602 of the common signal line N gradually change in accordance with the parasitic capacitance of the signal accumulating unit and the common signal transferring part.

When the read reference pulse PCSEL(1) changes to a low level at the time t64, the read signal CSEL(1) also changes to a low level, and the read period (the time t63 to the time t64) ends.

Further, at the time t64, the reset pulse BCHR(1) is set at a high level. Thereby, the potential of the block wiring (1) is set at a reset potential VCHR by the reset unit 117. Subsequently, the potential of the common signal line 106 is et at the reset potential VCHR by the reset unit 118, and the potential of the signal path of the common signal transferring unit gradually changes to the reset potential VCHR.

The same applies correspondingly to the following. At a time t65, the reset signal BCHR(1) is set at a low level, and the signal of the next column circuit is read in a period from a time t66 to a time t67. In the present embodiment, when read of the signals corresponding to four column circuits included in the first column circuit block is finished, the shift pulse PSHIFT is transferred to the next block horizontal scanning unit. Each of the block horizontal scanning units operates in the same timing as the operation period (the time t61 to a time t68) of the read circuit unit (1).

According to the present embodiment, the reset unit included in each of the block wirings is controlled by the reset control unit of each of the block horizontal scanning units. Specifically, the reset timing of the block wiring can be determined by the delay circuit of the reset control unit, and the reset time of each of the block wirings can be made constant. As a result that the reset time of each of the block wirings becomes constant, superimposition of offset voltages at the output level among the respective block wirings is suppressed, and image quality degrading by shading can be suppressed. Further, the respective block wirings can be reset without passing through the common signal line, and a reset operation can be performed in a short time.

Further, in the present embodiment, the target that is scanned in each of the block horizontal scanning units is described as the column circuit block, and the present invention can be similarly applied to the case in which one block is configured by a plurality of signal accumulating units.

Comparative Example

The effect of the present embodiment will be described in more detail by using a comparative example. Further, embodiments 2 and 3 which will be described later also have the same effect to the comparative example as embodiment 1.

Figure 8:
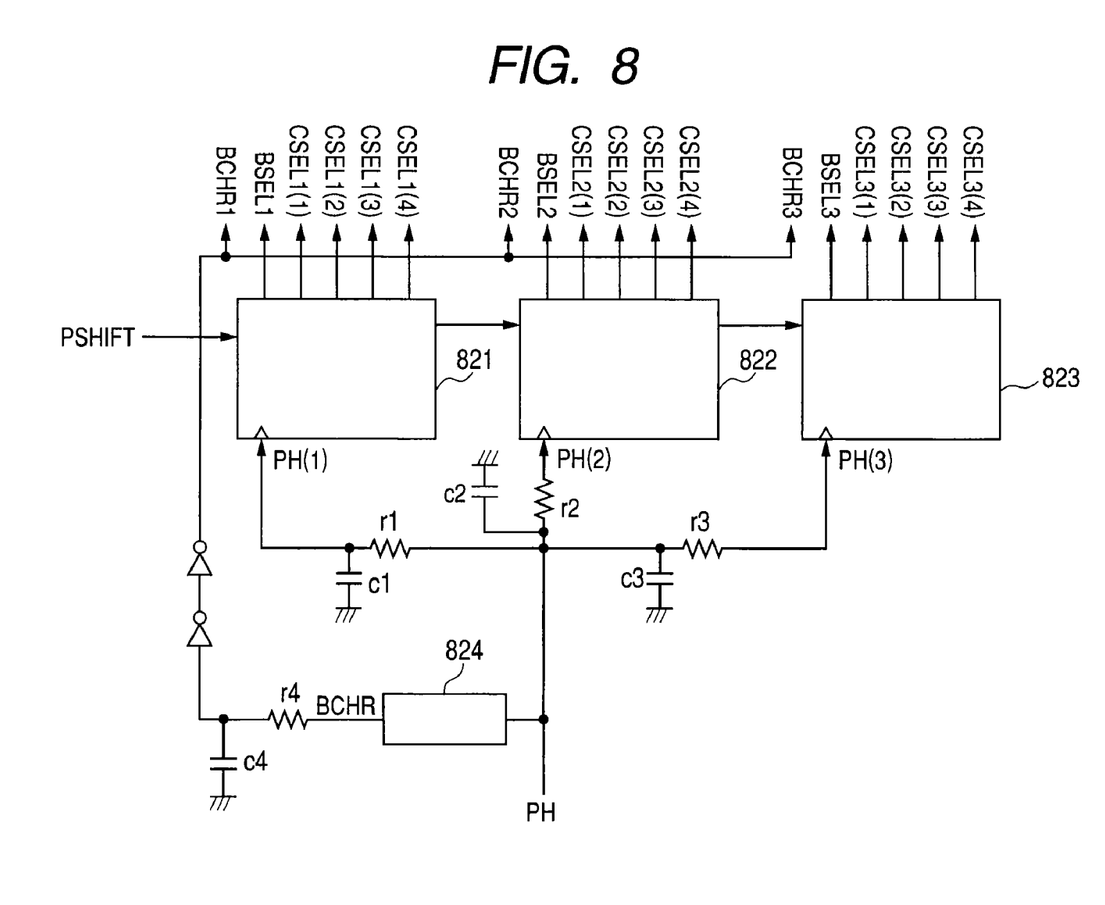
FIG. 8 is a configuration diagram of a horizontal scanning unit according to a comparative example.

FIG. 8 illustrates a circuit configuration of a horizontal scanning unit of the comparative example. The components having the same functions as those in FIG. 3 are assigned with the same reference numerals and characters, and detailed description of them will be omitted.

Block horizontal scanning units 821 to 823 are included. A reset control unit 824 is also included. According to the present comparative example, one reset control unit 824 is commonly provided for a plurality of reset units. Specifically, the reset control unit is not provided in the block horizontal scanning unit. As in the above described embodiment, due to the resistors r1 to r3 by leading the wirings and the parasitic capacitors c1 to c3, the reference pulses PH(1) to PH(3) which are supplied to the respective block horizontal scanning units are supplied to the respective block horizontal scanning units with different time constants. Since the timings of the reference pulses PH(1) to PH(3) differ in the respective block horizontal scanning units, the timings of the read pulse CSEL differ in the respective block horizontal scanning units.

However, the reset pulse BCHR which supplies a timing of resetting the block wiring is supplied to each of the reset units through a buffer circuit and the like, and therefore, a shift of the timing due to a difference in the time constant is not so large as the reference pulses PH(1) to PH(3). The timing can be regarded as substantially common to all blocks. In this case, the reset pulse BCHR needs to be supplied in response to the supply timing of the block horizontal scanning unit with the smallest time constant of the signal path to which the reference pulse is supplied, that is, the block horizontal scanning unit to which the pulse PH is supplied the earliest. Therefore, the margin becomes long in the block horizontal scanning unit to which the pulse PH is supplied the latest, and this interferes with enhancement in speed. Partially overlapping the high-level period of the read pulse CSEL and the high-level period of the reset pulse BCHR is conceivable, but in this case, the overlapped periods differ in each block. Specifically, the read time differs in each block, which may lead to shading.

Figure 9:
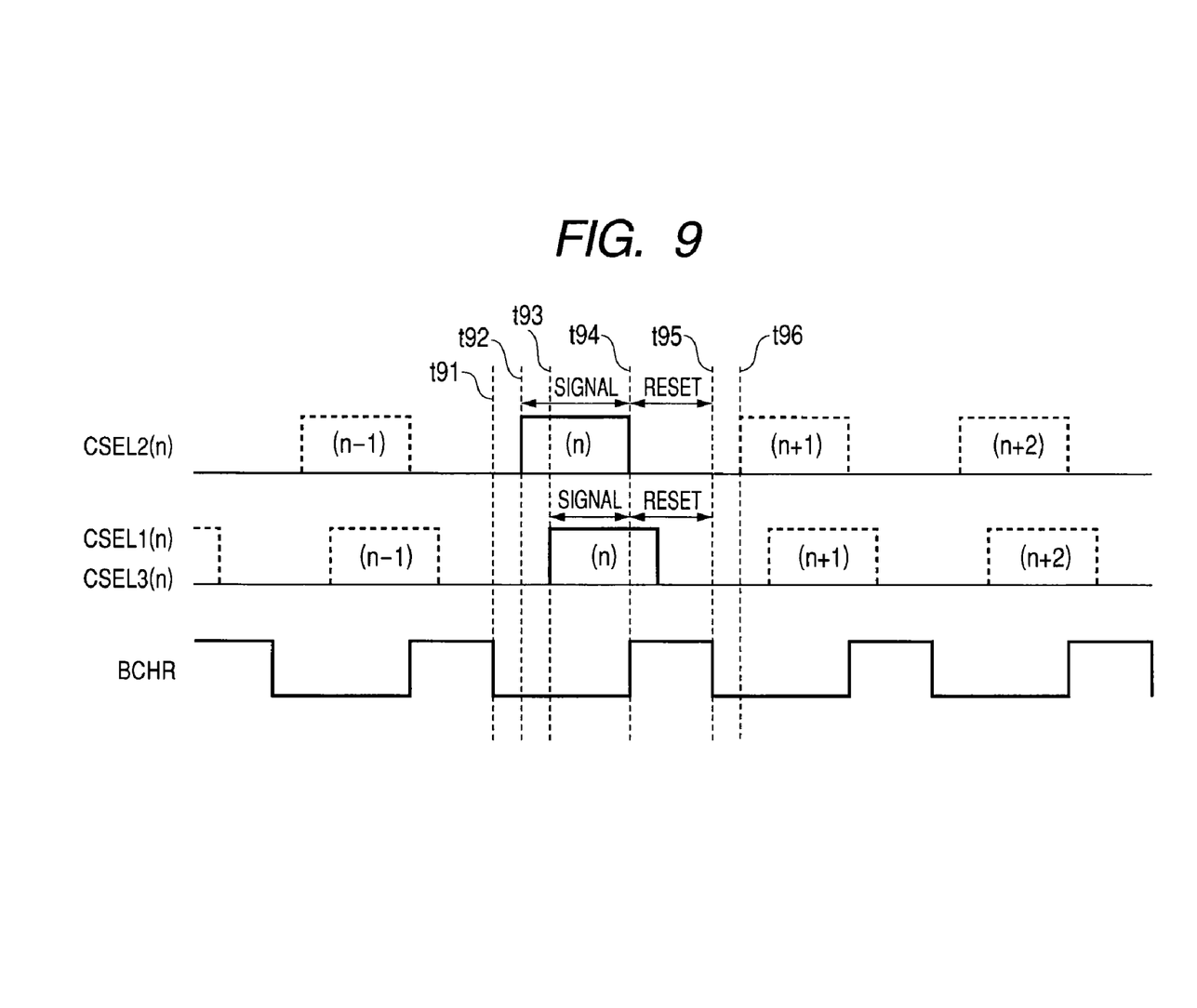
FIG. 9 is a timing chart of the horizontal scanning unit according to the comparative example.

FIG. 9 illustrates a timing chart of the reset control unit of the comparative example. The drop timing of the reset pulse BCHR is substantially the same in all the blocks as described above, and therefore, the pulse is shown as common to all the blocks.

The reset pulse BCHR needs to have a margin with respect to the timing of rise of the read pulse CSEL2 generated by the reference pulse PH(2) with the smallest time constant of the supply path. The temporal margins are from t91 to t92, and from t95 to t96. When the margin is determined with the read pulse CSEL2 as a reference, the margin becomes large with respect to the timings of rise of the CSEL1 and CSEL3, and this becomes a wasteful time, and interferes with enhancement in speed of signal reading.

Further, the period in which the reset pulse BCHR is at a high level has a period overlapping the period in which the read pulses CSEL1 and CSEL3 are at a high level. In such a case, the length of the signal reading period by the read pulses CSEL1 and CSEL3 becomes shorter than the signal reading period of the read pulse CSEL2, and the lengths of the signal reading periods differ among the column circuit blocks. The reading period of the CSEL2 is from t92 to t94, and the reading periods of the CSEL1 and CSEL3 are from t93 to t94. Thereby, shading may occur.

In order not to provide such an overlapped period, it is conceivable to perform an operation by matching the rise of the reset pulse BCHR with the drop of CSEL1 and CSEL3. However, in this case, a sufficient time cannot be taken for a reset operation, or if a sufficient time is secured for the reset operation, signal reading speed is further reduced.

Embodiment 2

Figure 10:
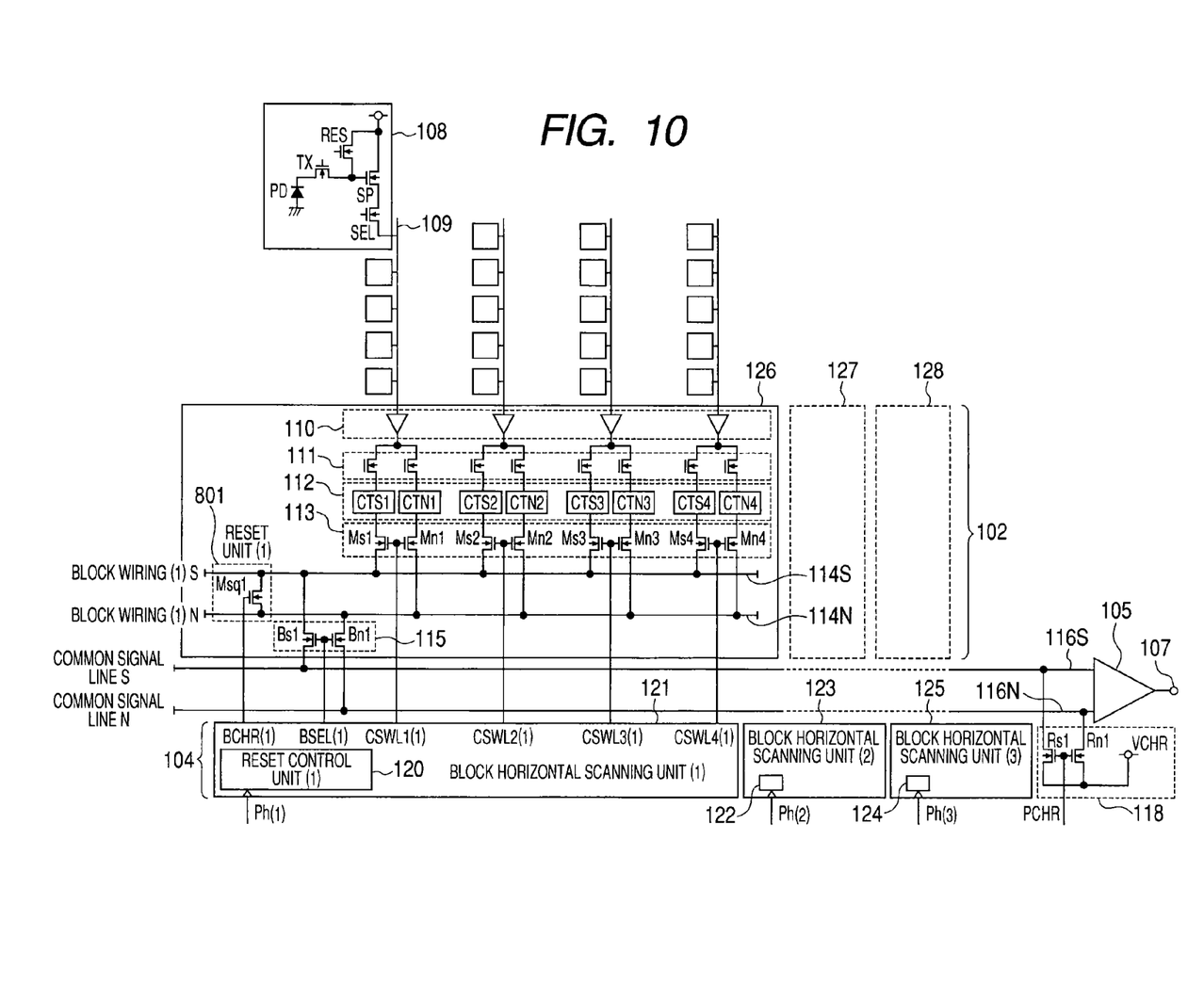
FIG. 10 is a block diagram for describing a signal path of a solid-state imaging apparatus according to embodiment 2.

FIG. 10 illustrates a block diagram of a signal path from a pixel unit to a column circuit unit and a common signal transferring unit of the present embodiment. The components assigned with the same reference numerals and characters as those in FIG. 2 have the same functions, and therefore, detailed description of them will be omitted. In the present embodiment, what differs from embodiment 1 is the use of a construction electrically connecting a pair of block wirings as the reset unit.

A reset unit 801 is included in the present embodiment. The reset unit 801 includes a switch Meq for bringing a block wiring (1)114S for outputting optical signals and a block wiring (1)114N for outputting noise signals into an electrical continuity state in the high-level period of a reset signal BCHR (1). Subsequently, a difference of the signals which are read to the respective block wirings is arithmetically operated thereafter, and thereby, a desired signal can be obtained.

The amplitude of the signal read from an accumulating capacitor CTN1 is smaller and has a substantially constant value as compared with the amplitude of the signal read from an accumulating capacitor CTS1, and therefore, the reset operation can be performed in a short time. Specifically, the reset operation of the block wiring (1)114N for outputting noise described above can be performed in a relatively short time.

The amplitude of the signal read from the accumulating capacitor CTS1 is large as compared with that of the signal read from the accumulating capacitor CTN1, and more electric charges are charged in the common signal line and block wiring in order to output the signal. Specifically, the reset operation of the block wiring (1)114S for outputting optical signals takes longer time as compared with the reset operation of the block wiring (1)114N for outputting noise signals.

The wiring which discharges many charges for a reset operation, and the wiring which can perform a reset operation in a short time are bought into continuity and are set at the same potential as above, and thereby, the reset operation can be performed in a short time.

According to such a construction, the circuit configuration of the reset unit can be simplified as compared with that of embodiment 1. Further, since the difference in the reset time among the respective blocks can be made small, superimposition of the offset voltages at the output level among the respective block wirings is suppressed, and influence on the image quality by shading can be suppressed.

Embodiment 3

Figure 11:
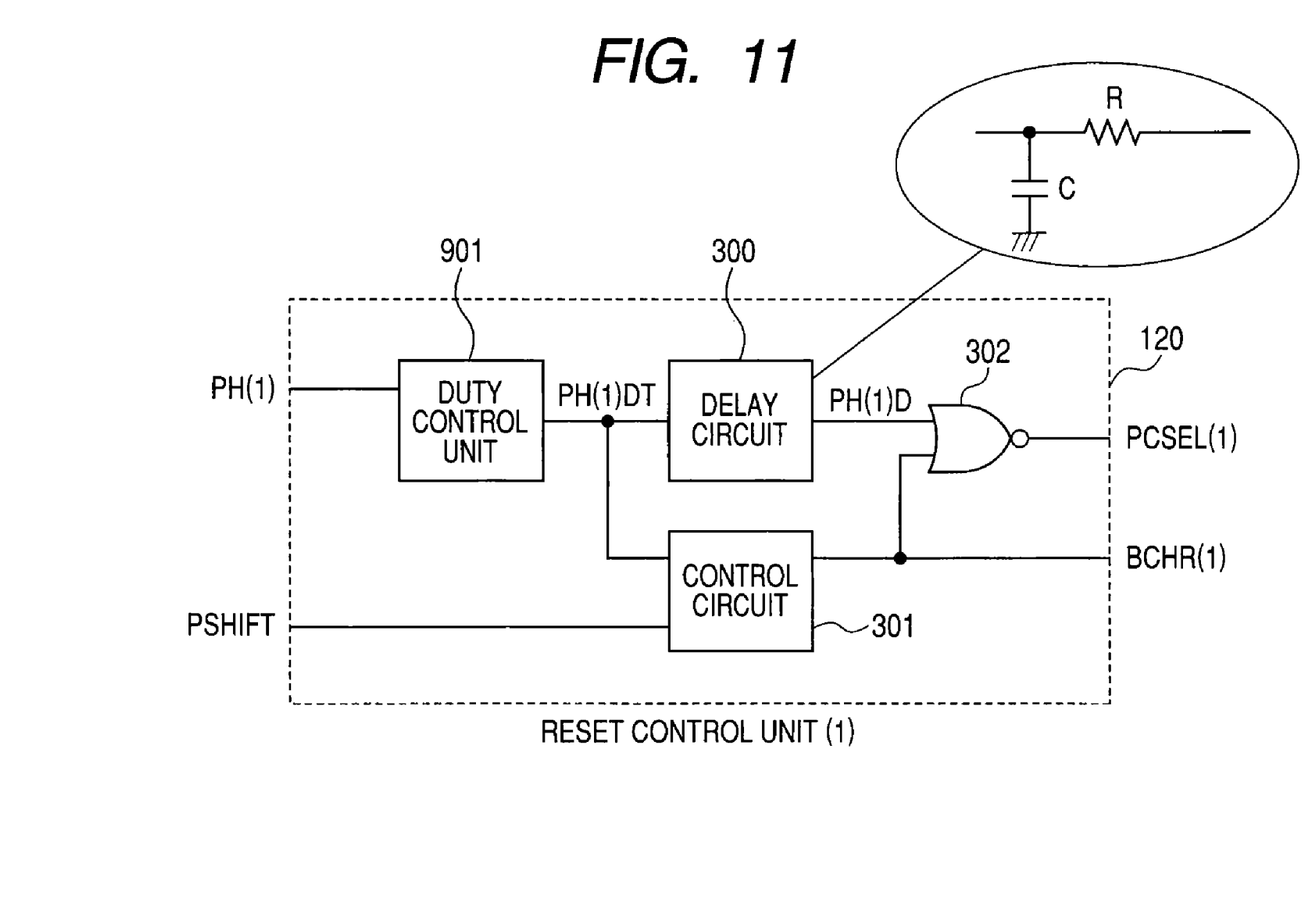
FIG. 11 is a block diagram of a reset control unit according to embodiment 3.

FIG. 11 illustrates a construction of a reset control unit of the present embodiment. The components having the same functions as those in FIG. 4 are assigned with the same reference numerals and characters, and detailed description of them will be omitted. In the present embodiment, a duty control unit 901 which controls duty of the reference pulse PH is included in the reset control unit in each of the block horizontal scanning units. By changing the duty of the reference pulse PH of each of the block horizontal scanning units, the length of the reset period can be changed. A reference pulse PH(1) is supplied to the duty control unit 901, where PH(1)DT with the duty changed is generated. Thereafter, PH(1)DT is supplied to the delay circuit 300 and the control circuit 301. In the delay circuit 300, PH(1)D' is generated. In the control circuit 301, a reset pulse a BCHR(1) is generated by the shift pulse PSHIFT and the PH(1)DT. In the logic circuit 302, a PCSEL(1) is generated by the BCHR(1) and PH(1)D'.

Figure 12:
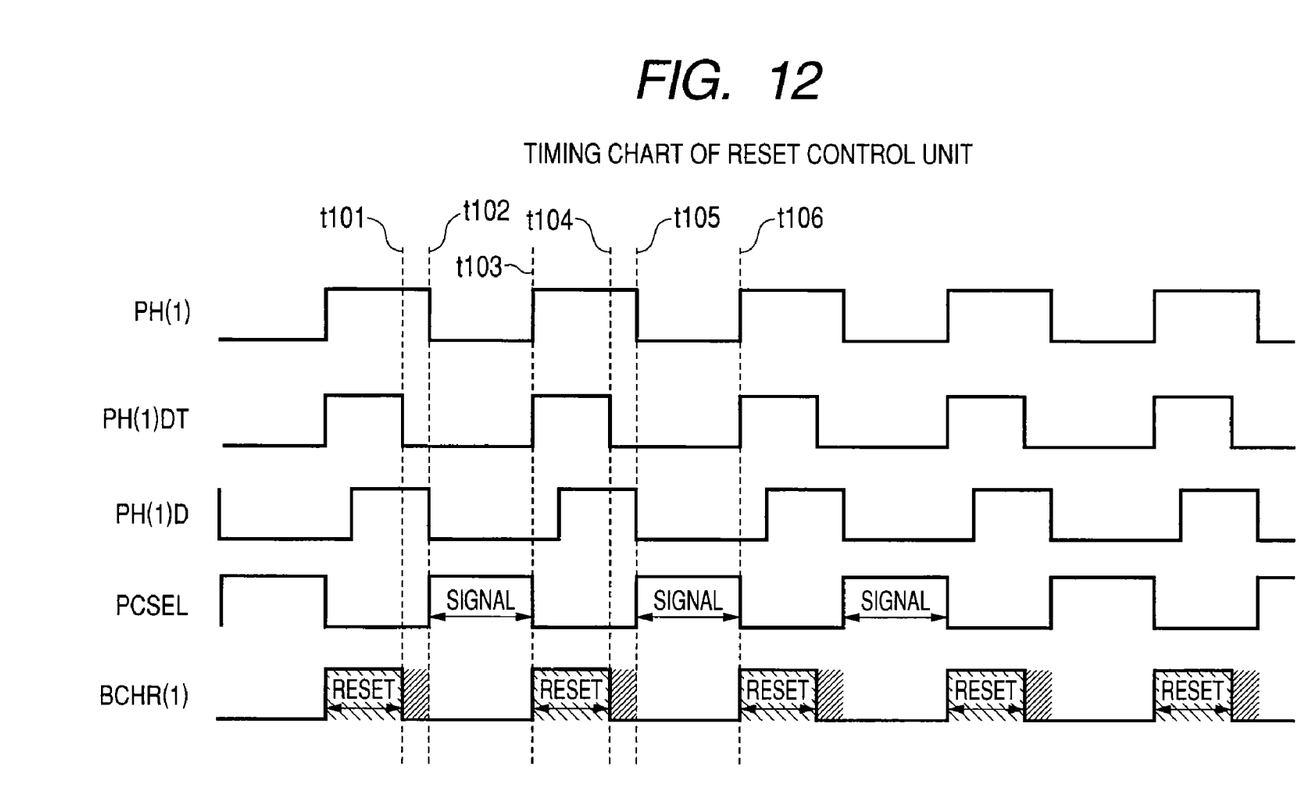
FIG. 12 is a timing chart of the reset control unit according to embodiment 3.

FIG. 12 is an operation timing chart of a reset control unit (1)120.

When the reference pulse PH(1) is input into the reset control unit (1)120, the duty of the reference pulse PH(1) is changed by the duty control unit 901. A time from t101 to t102 corresponds to the duty change. A delay signal PH(1)D' which is made by delaying the reference pulse PH(1)DT with the duty changed by the time from the time t101 to the time t102 is generated by the delay circuit 300. The reset control unit (1)120 generates the read reference pulse PCSEL(1) by the logical sum of the reference pulse PH(1)DT with the duty being changed and the delay pulse PH(1)D' (the time t102 to a time t103). Meanwhile, at the same timing as the reference pulse PH(1)DT with the duty being changed, the reset signal BCHR(1) is generated.

According to the present embodiment, the duty of the reference pulse PH(1) can be made variable. Thereby, an arbitrary reset period can be set, and a more favorable image signal can be obtained.

Application to Imaging System

Figure 13:
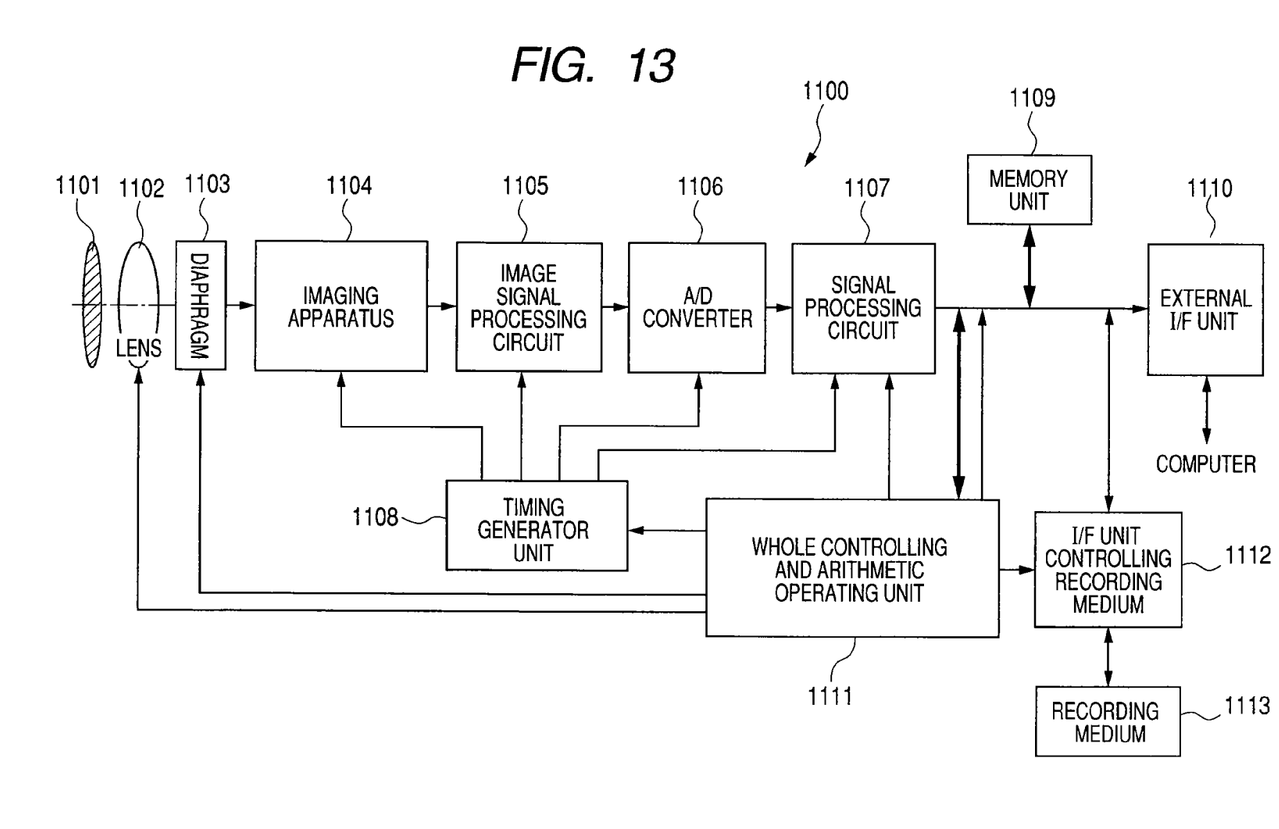
FIG. 13 is a block diagram in the case of applying the solid-state imaging apparatus of the present invention to an imaging system.

FIG. 13 illustrates an example of a circuit block in the case of applying the solid-state imaging apparatus according to the present invention to a camera that is an imaging system. A shutter 1101 is arranged in front of a photographing lens 1102 to control exposure. The light quantity is controlled by a diaphragm 1103 according to necessity, and the solid-state imaging apparatus 1104 forms an image. A signal output from the solid-state imaging apparatus 1104 is processed in a signal processing circuit 1005, and is converted into a digital signal from an analog signal by an A/D converter 1106. The A/D converter 1106 may be included in the solid-state imaging apparatus.

The digital signal output from the A/D converter 1106 is further subjected to arithmetic operation processing in a signal processing unit 1107. The processed digital signal is accumulated in a memory 1109, or transferred to external equipment through an external I/F 1110. The solid-state imaging apparatus 1104, the imaging signal processing circuit 1105, the A/D converter 1106 and the signal processing unit 1107 are controlled by a timing generator unit 1108. The control pulses such as PH and PSHIFT in each of the embodiments are supplied from the timing generator unit 1108. The timing generator unit 1108 also can be provided in the solid-state imaging apparatus 1104.

The whole imaging system is controlled by a whole controlling and arithmetic operating unit 1111. In order to record an image in a recording medium 1113, the output digital signal is recorded through a recording medium controlling I/F unit 1112 controlled by the whole controlling and arithmetic operating unit.

The present invention is described above by citing the concrete embodiments, but the present invention is not limited to these embodiments, and appropriate changes and addition of constructions can be made as long as they do not depart from the concept of the invention.

For example, the construction including the block wirings is especially described as the common signal transferring unit, but the present invention is not limited to this, and can be applied to the construction having only the common output line. However, in this case, a plurality of reset units that reset the potential of the common output line are included, and the reset control unit which controls each of the reset units is provided for each block horizontal scanning unit. Further, in the case of having a block wiring, the number of block divisions of each of the block horizontal scanning units and the number of block divisions of the block wiring do not have to be the same. If only the reset control unit is included in each of the block horizontal scanning units, the problem of the reset timing shifting in each of the block horizontal scanning units can be suppressed, and therefore, it is sufficient if at least such a construction is included.

Each of the above described embodiments only shows an example of embodiment in carrying out the present invention, and the technical scope of the present invention is not there by intended to be interpreted restrictively. More specifically, the present invention can be carried out in various forms without departing from its technical idea or its main characteristic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-232317, filed Sep. 10, 2008, which is hereby incorporated by reference herein in its entirety.

What is claimed is:

1. A solid-state imaging apparatus comprising:
    a plurality of signal accumulating units for accumulating signals based on outputs from a plurality of pixels, each including a photoelectric conversion element, arranged in a plurality of columns;
    a common signal line for transferring signals outputted from each of the plurality of signal accumulating units;
    a plurality of block wirings each arranged correspondingly to a number of the plurality of signal accumulating units coupled to the pixels of a part of the columns, the number being smaller than the total number of the plurality of signal accumulating units;
    a plurality of reset units each resetting a potential of a corresponding one of the block wirings;
    a plurality of block horizontal scanning units for outputting, to the common signal line, the signal accumulated in the plurality of signal accumulating units; and
    a plurality of reset controlling units each for controlling a respectively corresponding one of the plurality of reset units, each reset controlling unit being arranged in a respectively corresponding one of the plurality of block horizontal scanning units.

2. The solid-state imaging apparatus according to claim 1, wherein the reset unit resets a potential of the block wiring.

3. The solid-state imaging apparatus according to claim 1, wherein the reset controlling unit includes a delay circuit.

4. The solid-state imaging apparatus according to claim 2, further comprising:
    a second common signal line,
    wherein the block wirings include a block wiring for outputting a light signal coupled to the common signal line, and a block wiring for outputting a noise signal coupled to the second common signal line, and
    wherein the reset unit includes a switch for setting, at an electrically conducting state, the block wiring for outputting the light signal and the block wiring for outputting the noise signal.

5. The solid-state imaging apparatus according to claim 1, wherein the reset controlling unit includes a duty controlling unit for changing a duty of the reference pulse.

6. The solid-state imaging apparatus according to claim 1, wherein the block horizontal scanning unit supplies a selecting signal for indicating a period of reading out to the common signal line the signals of the signal accumulating units included in a block of a plurality of blocks, and
    wherein the reset controlling unit controls such that the reset unit is arranged correspondingly to a block wiring corresponding to a block of the signal accumulating units to which the selecting signal is not supplied.

7. An imaging system comprising:
    an optical system;
    the solid-state imaging apparatus according to claim 1, for imaging through the optical system; and
    a signal processing unit for processing a signal outputted from the solid-state imaging apparatus.

8. The solid-state imaging apparatus according to claim 1, wherein the plurality of block horizontal scanning units are driven by a common signal.

* * * * *